United States Patent [19]

Sano et al.

[11] Patent Number: 5,574,592
[45] Date of Patent: Nov. 12, 1996

[54] ROTATABLE POLYGON MIRROR

[75] Inventors: Yasukazu Sano; Nobuhiko Tsuji; Tetsuya Saito; Tomio Shimizu; Naoki Kaiho, all of Kanagawa, Japan

[73] Assignee: Fuji Electric Co., Ltd., Kanagawa, Japan

[21] Appl. No.: 464,462

[22] Filed: Jun. 5, 1995

Related U.S. Application Data

[63] Continuation of Ser. No. 125,850, Sep. 24, 1993, abandoned.

[30] Foreign Application Priority Data

Dec. 24, 1992 [JP] Japan ..................... 4-342956

[51] Int. Cl.$^6$ ..................... G02B 26/08
[52] U.S. Cl. ............ 359/211; 359/216; 359/833; 359/834
[58] Field of Search ..................... 359/216–218, 359/222, 850, 198, 867–869, 220, 203, 209, 211, 212, 223, 226, 833, 834

[56] References Cited

U.S. PATENT DOCUMENTS

| | | | |
|---|---|---|---|
| 3,828,124 | 8/1974 | Baum | 359/216 |
| 4,768,861 | 9/1988 | Epner | 359/216 |
| 4,993,791 | 2/1991 | Burt et al. | 359/217 |
| 5,033,807 | 7/1991 | Merke | 359/216 |
| 5,039,184 | 8/1991 | Murakawa et al. | 359/216 |
| 5,184,246 | 2/1993 | Schwartz et al. | 359/216 |

FOREIGN PATENT DOCUMENTS

| | | | |
|---|---|---|---|
| 1137296 | 4/1967 | Germany | 359/216 |
| 0185514 | 7/1989 | Japan | 359/216 |
| 1182470 | 9/1985 | U.S.S.R. | 359/216 |
| 2110897 | 6/1983 | United Kingdom | 359/216 |

OTHER PUBLICATIONS

"Precision Machining of High–Quality Polygonal Mirrors", Matsushita et. al., R. D. Kobe Steel Engineering Reports, 39(4):39–42 (1989).

"Injection Molding of a Polygon Mirror", Nunoshita et. al., Japan Steel Works Engineering Report, 46:94–98.

"Plastic–molded total–reflection type polygonal laser beam deflector", Kaiho et. al., Technical conference 2000–14, SPIE Annual Meeting 1993 International Symposium on Optics, Imaging, and Instrumentation 12 Jul. 1993.

*Primary Examiner*—Paul M. Dzierzynski
*Assistant Examiner*—Darren E. Schuberg
*Attorney, Agent, or Firm*—Finnegan, Henderson, Farabow, Garrett & Dunner, L.L.P.

[57] ABSTRACT

A rotatable polygon mirror comprising a transparent regular polygonal cylinder having the sides of a regular polygon. The sides are rotationally symmetrical with one another relative to a rotating axis of the transparent regular polygonal cylinder. The transparent regular polygonal cylinder has inner surfaces in the body of the transparent regular polygonal cylinder which correspond to the respective sides of the regular polygon, where the inner surfaces consist of total internal reflection surfaces.

23 Claims, 5 Drawing Sheets

ROTATABLE POLYGON MIRROR

This application is a continuation of application Ser. No. 08/125,850, filed Sep. 24, 1993, now abandoned.

BACKGROUND OF THE INVENTION

The invention relates to rotating polygon mirrors used for scanning an optical beam in bar code readers.

FIG. 6 is a perspective view showing a construction of an optical beam scanner using a conventional rotating polygon mirror. In, FIG. 6, a rotating polygon mirror 1 is formed of a regular polygonal column, and has, on the respective side surfaces thereof, a plurality of reflective surfaces 11 (11a, 11b, 11c, 11d, . . . ) arranged so as to be rotationally symmetrical with one another relative to the axis 2 of the regular polygonal column.

A light source 3 includes a laser diode 3a and a convergent lens 3b. An optical beam 4 from the light source 3 is projected obliquely onto one of the reflective surfaces 11 of the rotating polygon mirror 1, e.g., the reflective surface 11a, and is reflected by the reflective surface 11a to irradiate a subject area 5. Since the rotating polygon mirror 1 is rotated in a direction of an arrow P around the axis of the regular polygonal column (hereinafter referred to as the "rotating axis") 2 by a drive unit (not shown), a reflecting surface sequentially change in the order of the reflective surfaces 11a, 11b, 11c, 11d, . . . , causing the optical beam 4 to move in a direction of an arrow Q within the subject area 5 every time the reflective surface changes.

Optical beam scanners of this type are used, e.g., for bar code readers. In this case, the subject area 5 is a bar code directly printed on a label bonded onto a product or the surface of a product. The subject area 5 is scanned by the optical beam, and the reflective light is received by a not shown light receiving device to thereby read the bar code data by photoelectric conversion.

The above-mentioned rotating polygon mirror is formed by cutting a solid body (e.g. aluminum body) into a regular polygonal column and polishing the respective side surfaces of the regular polygonal column so that such side surfaces are formed into reflective surfaces. The polishing process is performed by machining. (R·D KOBE STEEL ENGINEERING REPORTS/Vol.39 No.4, PP39–42 (1989), "Precision Machining of High-Quality Polygonal Mirrors") Thus, this process is not suited for mass production, and is disadvantageous in terms of cost. In the meantime, the process of fabricating a regular polygonal column by resin molding and forming the reflective surfaces by metal deposition or plating the side surfaces of the regular polygonal column has been developed. (JAPAN STEEL WORKS ENGINEERING REPORT No.46, PP 94–98, "Injection Molding of a Polygon Mirror") These methods are suitable for mass production, but address the problem that peel-off, discoloration, cracks, or the like are easy to occur due to the metal deposition or the plating being affected by the ambient temperature and humidity.

Further, the function of the rotating polygon mirror is limited to constant-angle scanning, giving functions such as convergence and divergence of an optical beam or constant-velocity linear scanning of the optical beam required to be performed by laser beam printers, or the like to an optical lens that is independent of the rotating polygon mirror. Therefore, downsizing and cost reduction of devices thus applied have been difficult.

SUMMARY OF THE INVENTION

The invention has been made in view of the above circumstances. Accordingly, the object of the invention is to provide a rotating polygon mirror which is suitable for mass production and whose reflective surfaces have improved durability by solving the above problems.

To achieve the above object, the invention is applied to a rotating polygon mirror having a plurality of reflective surfaces rotationally symmetrical with one another relative to a rotating axis, the plurality of reflective surfaces being total internal reflection surfaces formed on inside surfaces of a transparent regular polygonal cylinder.

Further, in the rotating polygon mirror, the plurality of reflective surfaces are first total internal reflection surfaces formed as a result of removing a portion of a regular polygonal truncated cone, from the transparent regular polygonal cylinder, having a bottom surface which is similar to and concentric with a bottom surface of the regular polygonal cylinder and whose diagonals coincide with corresponding diagonals of the regular polygonal cylinder. The first total internal reflection surfaces are formed on respective inner side surfaces that are inclined relative to outer side surfaces of the regular polygonal cylinder.

Still further, in the rotating polygon mirror, the plurality of reflective surfaces are first and second total internal reflection surfaces formed not only by removing a part of a regular polygonal truncated cone, from the transparent regular polygonal cylinder, having a bottom surface which is similar to and concentric with a bottom surface of the regular polygonal cylinder and whose diagonals coincide with the corresponding diagonals of the regular polygonal cylinder, but also by removing another part of a inverted regular polygonal truncated cone, from the transparent regular polygonal cylinder, having an upper surface which is similar to and concentric with an upper surface of the regular polygonal cylinder and whose diagonals coincide with the corresponding diagonals of the regular polygonal cylinder. The first and second total internal reflection surfaces are formed on respective inner side surfaces that are inclined relative to outer side surfaces of the regular polygonal cylinder.

Still further, the total internal reflection surfaces formed on the respective inner side surfaces forming the transparent body are such that at least either the first or the second total internal reflection surfaces are curved surfaces instead of flat surfaces, and the curved surfaces are formed by removing a regular polygonal truncated cone or an inverted regular polygonal truncated cone. The regular polygonal truncated cone has a flat bottom surface whose respective sides of a regular polygon are curved so as to be convex or concave relative to the center of the regular polygon. The inverted regular polygonal truncated cone has a flat upper surface whose respective sides are curved as same as the above.

Still further, outer side surfaces of the transparent body are curved surfaces instead of flat surfaces, and the curved surfaces are formed of outer side surfaces of a cylinder having a flat bottom surface whose respective sides of a regular polygon are curved so as to be convex or concave relative to the center of the regular polygon.

Still further, the total internal reflection surfaces formed on the respective inner side surfaces forming the transparent body are such that at least either the first or the second total internal reflection surfaces are curved surfaces instead of flat surfaces, and the curved surfaces have mountainous or valley-like curves outward relative to the rotating axis.

Still further, the outer side surfaces forming the transparent body are curved surfaces instead of flat surfaces, and the curved surfaces have mountainous or valley-like curves outward relative to the rotating axis.

The rotating polygon mirror thus constructed of the invention is provided with total internal reflection surfaces as the reflective surfaces formed on inner side surfaces thereof. Therefore, the reflective surfaces are not exposed to the outside directly as is the case with the conventional example, which contributes to maintaining stable conditions and thus improving durability. Since this transparent body can be fabricated by molding, e.g., a transparent resin, the transparent body is suitable for mass production.

Still further, by adding convex or concave surfaces to the thus constructed rotating polygon mirror as necessary, not only constant-angle scanning, but also constant-velocity linear scanning of the optical beam can be implemented.

DETAILED DESCRIPTION OF THE PREFERRED EMBODIMENTS

Figure 1A:
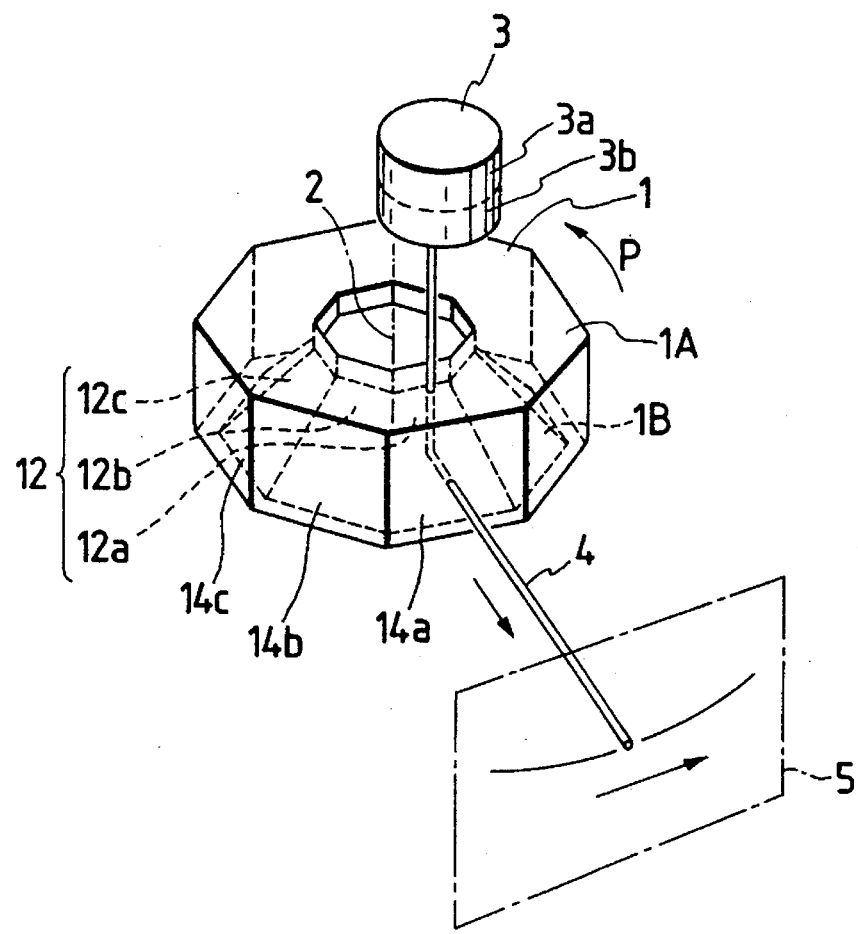
FIG. 1(a) is a schematic configurational diagram of an optical beam scanner to which an embodiment of the invention is applied.
Figure 1B:
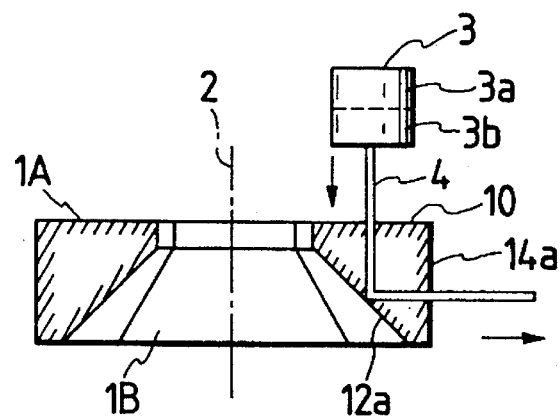
FIG. 1(b) is a sectional view taken from FIG. 1.
Figure 6:
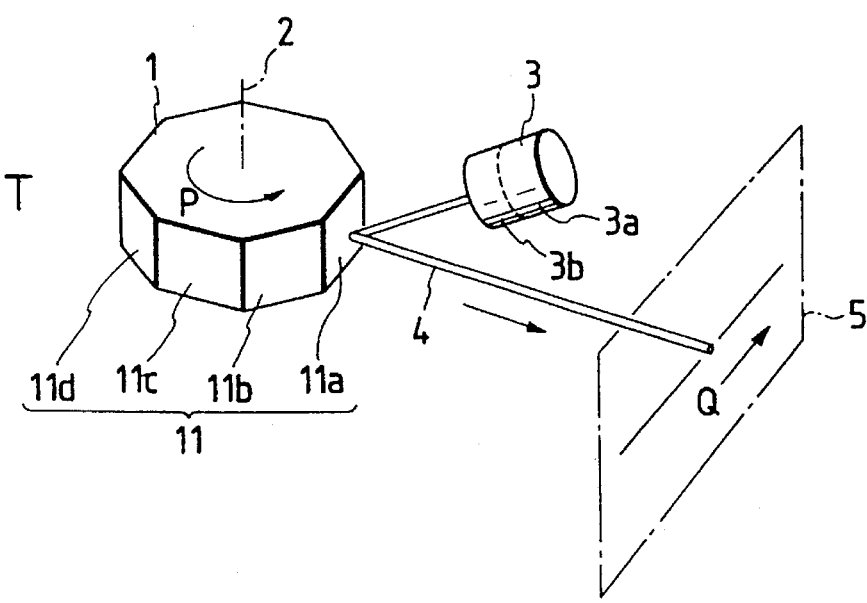
FIG. 6 is a perspective view of a conventional optical beam scanner.
Figure 5A:
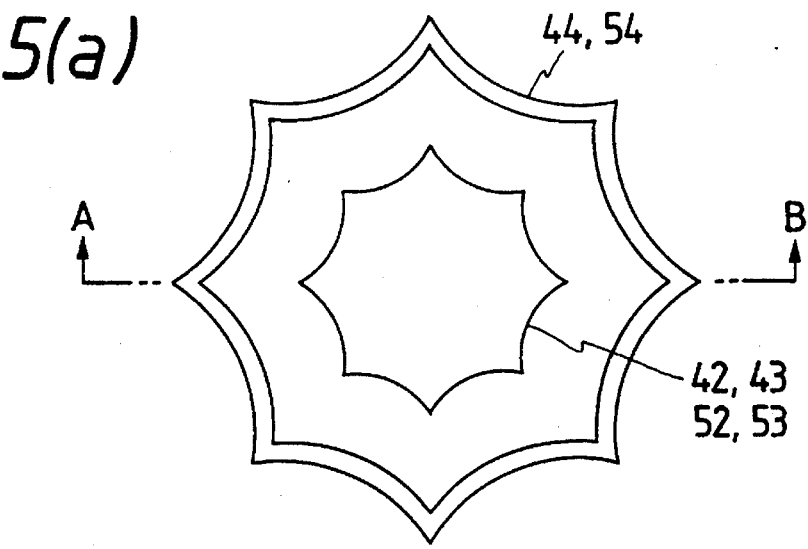
FIG. 5(a) is a diagram illustrative of concave surfaces of a rotating polygon mirror of the invention.
Figure 5B:
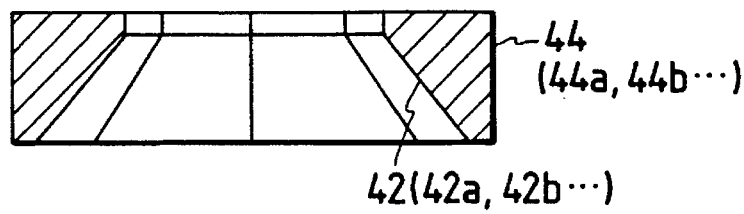
FIGS. 5(b)–5(e) are sectional views taken along line A–B in FIG. 5(a) showing further alternative convex surface configurations.
Figure 5C:
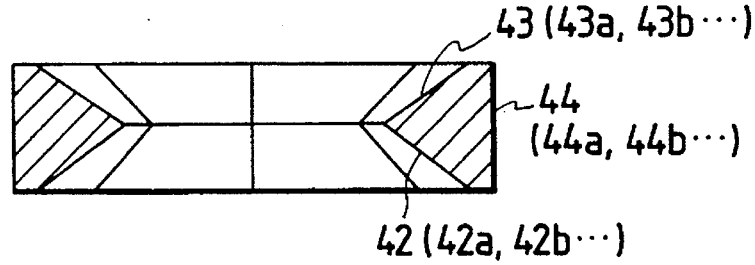
Figure 5D:
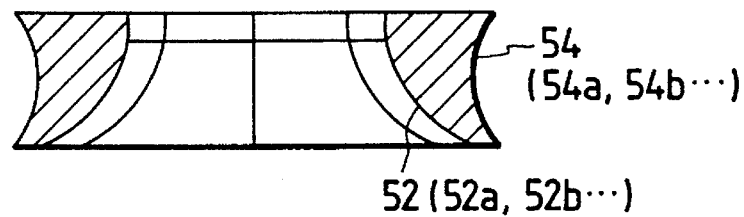
Figure 5E:
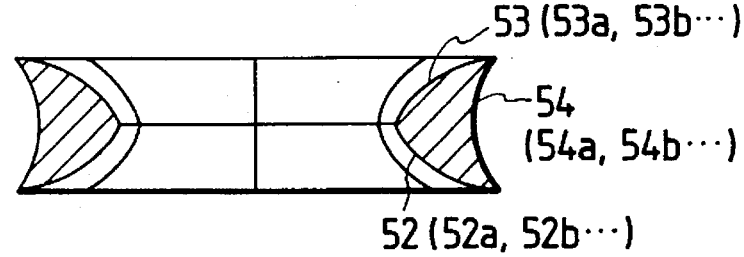

FIGS. 1 (a) and 1 (b) show an example of an optical beam scanner using a rotating polygon mirror of the invention. FIG. 1 (a) is a perspective view thereof and FIG. 1 (b) is a sectional view showing the main portion thereof. FIGS. 2 (a) and 2 (b) show another example of an optical beam scanner using a rotating polygon mirror of the invention. FIG. 2 (a) is a perspective view thereof and FIG. 2 (b) is a sectional view showing the main portion thereof. FIGS. 3(a)–3(c), 4(a)–4(c) and 5(a)–5(e), show other examples of rotating polygon mirrors; more specifically, they are diagrams defining relationships between convex and concave surfaces when surfaces of the rotating polygon mirror are curved surfaces instead of flat surfaces. FIGS. 3(a)–3(c) and 4(a)–4(c) show convex surfaces, whereas FIGS. 5(a)–5(e) show concave surfaces. In these figures, the parts and components corresponding to those of FIG. 6 are designated by the same reference characters.

In FIGS. 1 (a) and 1 (b), a rotating polygon mirror 1 is formed by removing a portion of a regular polygonal cone 1B from a regular polygonal cylinder 1A. The regular polygonal cylinder 1A is made of a transparent resin, such as PMMA (polymethyl Methacrylate), PC (polycarbonate), or a transparent body such as glass. The regular polygonal truncated cone 1B has a bottom surface of a regular polygon which is similar to and concentric with the bottom surface of the regular polygonal cylinder 1A and whose diagonals coincide with the corresponding diagonals of the regular polygonal cylinder 1A. Total internal reflection surfaces formed on the respective inner side surfaces that are inclined relative to the outer side surfaces 14 of the regular polygonal cylinder 1A while removing the portion of the regular polygonal truncated cone 1B from the regular polygonal cylinder 1A constitute reflective surfaces 12 (12a, 12b, 12c, . . . ).

An optical beam 4 from a light source 3 is injected downward from top of the rotating polygon mirror 1. The optical beam 4 enters into the upper end portion of the transparent rotating polygon mirror 1, is reflected by the reflective surface 12 (the reflective surface 12a in FIG. 1(b)) that is a total internal reflection surface, and exits from the outer side surface 14a of the rotating polygon mirror 1, and irradiates a subject area 5. The other operations are the same as those of the conventional rotating polygon mirror shown in FIG. 6.

FIGS. 2 (a) and 2 (b) shows another example of an optical beam scanner to which the rotating polygon mirror of the invention is applied. FIG. 2 (a) is a perspective view thereof and FIG. 2 (b) is a sectional view showing the main portion thereof. In FIGS. 2 (a) and 2 (b), the rotating polygon mirror is formed by removing, from a transparent regular polygonal cylinder 1A, not only a portion of a regular polygonal truncated cone 1B but also a portion of a regular polygonal truncated cone 1C. The regular polygonal truncated cone 1B has a bottom surface of a regular polygon which is similar to and concentric with the bottom surface of the regular polygonal cylinder 1A and whose diagonals coincide with the corresponding diagonals of the cylinder 1A. The regular polygonal truncated cone 1C has a top surface of a regular polygon which is similar to and concentric with the top surface of the regular polygonal cylinder 1A and whose diagonals coincide with the corresponding diagonals of the cylinder 1A. Total internal reflection surfaces formed on the respective inner side surfaces that are inclined relative to the outer side surfaces 14 of the regular polygonal cylinder 1A while removing the portion of the regular polygonal truncated cone 1B from the regular polygonal cylinder 1A constitute first reflective surfaces 12 (12a, 12b, 12c, . . . ). Further, total internal reflection surfaces formed on the respective inner side surfaces that are inclined relative to the outer side surfaces 14 of the regular polygonal cylinder 1A while removing the portion of the inverted regular polygonal truncated cone 1C from the regular polygonal cylinder 1A constitute second reflective surfaces 13 (13a, 13b, 13c, . . . ).

Figure 2A:
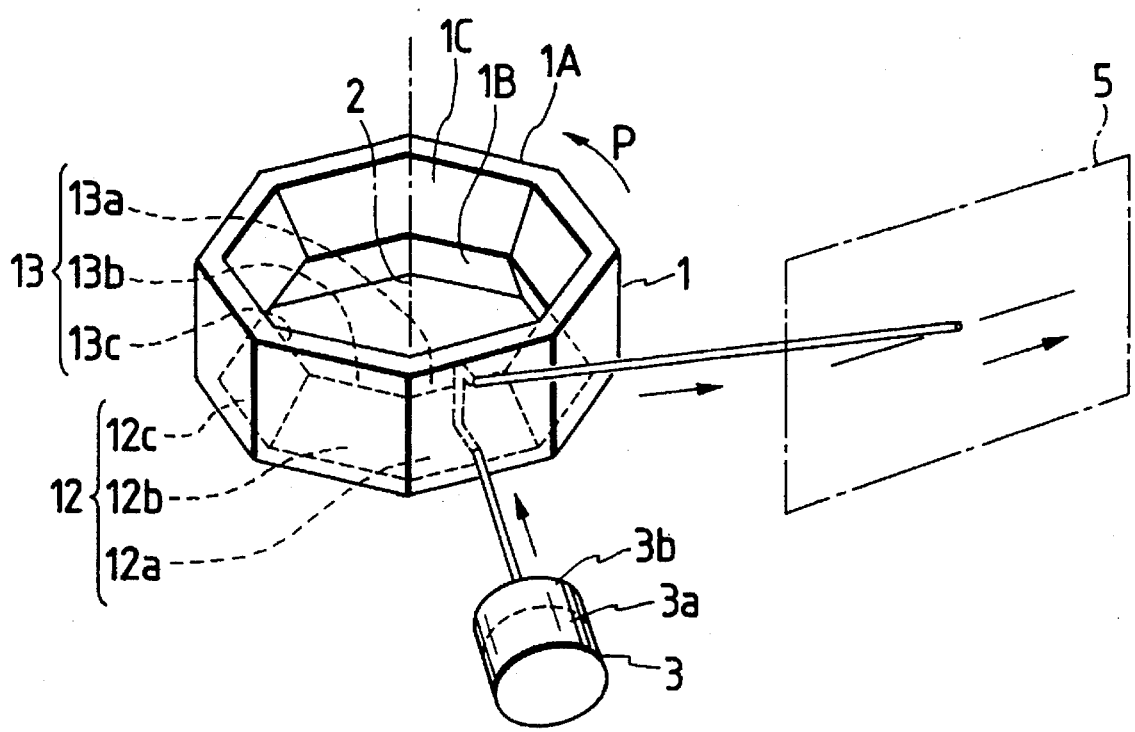
FIG. 2(a) is a schematic configurational diagram of an optical beam scanner to which another embodiment of the invention is applied.
Figure 2B:
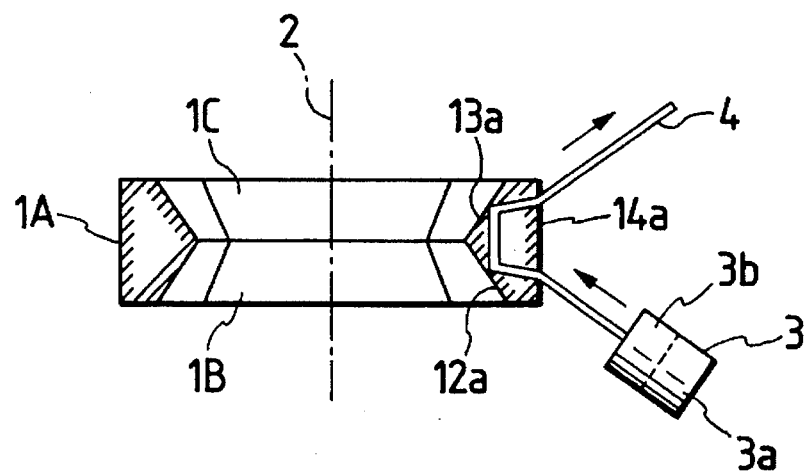
FIG. 2(b) is a sectional view taken from FIG. 2.
Figure 3A:
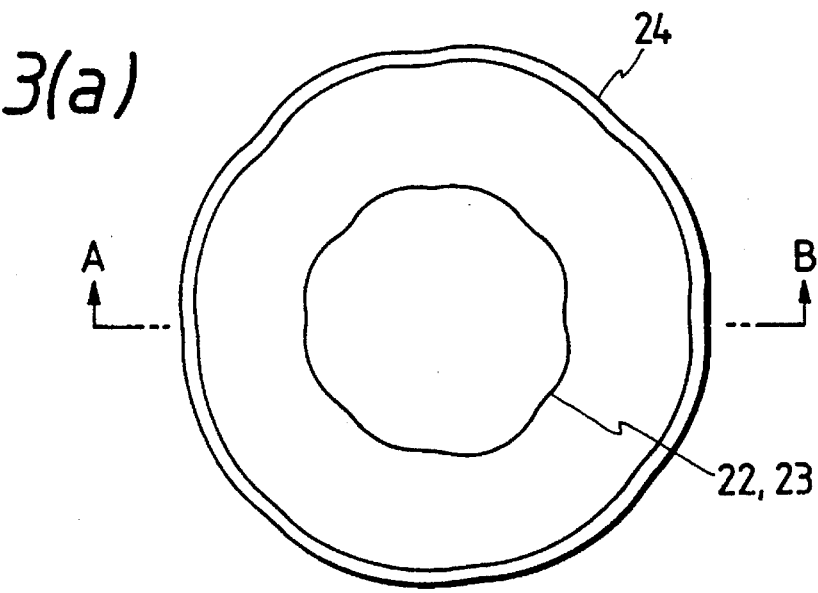
FIG. 3(a) is a diagram illustrative of convex surfaces of a rotating polygon mirror of the invention.
Figure 3B:
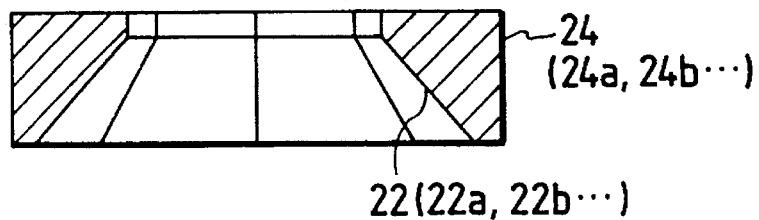
FIGS. 3(b) and 3(c) are sectional views taken along line A–B in FIG. 3(a) showing alternative convex surface configurations.
Figure 3C:
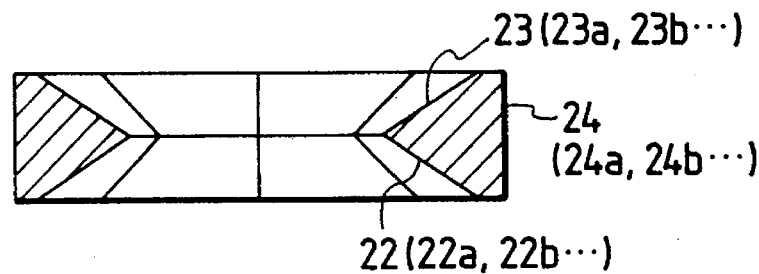

In the embodiment shown in FIGS. 2 (a) and 2 (b), the optical beam 4 from the light source 3 is projected from the outer side surface 14 of the rotating polygon mirror 1. The optical beam 4 enters into the transparent rotating polygon mirror 1 from the outer side surface 14a of the transparent rotating polygon mirror 1, is reflected by the first reflective surface 12 (the reflective surface 12a in FIG. 2 (a)) that is a total internal reflection surface to convert the direction upward. The optical beam 4 is further reflected by the second reflective surface 13a that is a total internal reflection surface, exits from the outer side surface 14a of the rotating polygon mirror 1, and irradiates the subject area 5. The other operations are the same as those of the rotating polygon mirror of the invention shown in FIG. 1(a). Through the polygon mirror of FIG. 1(a) the flat subject area 5 is scanned along a curved trace, the polygon mirror of FIG. 2(a) facilitates scanning the subject area 5 linearly with the laser beam fed horizontally onto either one group of the reflection surfaces.

FIGS. 3(a), 3(b), 3(c), 4(a), 4(b), 4(c), 5(a), 5(b), 5(c), 5(d) and 5(e) show rotating polygon mirrors, which are other embodiments of the invention. There are diagrams illustrative of relationships between convex and concave surfaces of the rotating polygon mirrors when reflective surfaces (12 or 13, or both) that are total internal reflection surfaces of the optical beam 4, or side surfaces (14) of the transparent rotating polygon mirrors 1 along the beam transmitting path are formed into curved surfaces instead of flat surfaces. FIGS. 3(a), 3(b), 3(c), 4(a), 4(b) and 4(c) show a variety of convex surfaces, and FIGS. 5(a), 5(a), 5(b), 5(c), 5(d) and 5(e) show a variety of concave surfaces.

FIGS. 3 (a) and 4 (a) show the rotating polygon mirror 1 as viewed from bottom; they show the bottoms of the regular polygonal cylinder 1A and regular polygonal truncated cones 1B, 1C of the rotating polygon mirrors 1 and the case where the respective sides of the regular polygon form convex surfaces facing outward relative to the center of the regular polygon. FIGS. 3 (b), 3 (c) and 4 (b), 4 (c) show sectional views taken along a line A–B of the respective embodiments. FIGS. 3 (b) and 4 (b) show the other embodiments corresponding to the embodiment of FIG. 1(a). FIGS. 3 (c) and 4 (c) show the other embodiments corresponding to the embodiment of FIG. 2(a).

In the embodiments of FIGS. 3 (b) and 3 (c), reflective surfaces 22 (22a, 22b, . . . ) corresponding to the first reflective surfaces 12 of the rotating polygon mirror 1 of FIG. 1(a), or reflective surfaces 22 (22a, 22b, . . . ), 23 (23a, 23b, . . . ) corresponding to the first and second reflective surfaces 12, 13 of the rotating polygon mirror 1 of FIG. 2(a) form curved surfaces instead of flat surfaces. These curved surfaces are formed by removing, from the regular polygonal cylinder 1A, a regular polygonal truncated cone or an inverted regular polygonal truncated cone. The regular polygonal truncated cone has a bottom surface that is a flat surface whose respective sides of the regular polygon are curved so as to be convex relative to the center of the regular polygon. The inverted regular polygonal truncated cone has a top surface that is the above-mentioned flat surface whose respective sides are curved. Side surfaces 24 (24a, 24b, . . . ) of the regular polygonal cylinder corresponding to the side surfaces 14 of the regular polygonal cylinder 1A of the rotating polygon mirror 1 of FIG. 1(a) or 2(a) are curved surfaces instead of flat surfaces. These curved surfaces are formed of outer side surfaces of the cylinder having the bottom surface that is the flat surface whose respective sides of the regular polygon are curved so as to be convex relative to the center of the regular polygon. That is, there are no curved surfaces in the direction of the rotating axis; the convex surfaces are formed in the direction opposite to the direction of the rotating axis 2.

The embodiments of FIGS. 4 (b) and (c) have reflective surfaces 32 (32a, 32b, . . . ), 33 (33a, 33b, . . . ) corresponding to the first and second reflective surfaces 12, 13 of the rotating polygon mirrors 1 of FIGS. 1(a) and 2(a). These surfaces are curved surfaces instead of flat surfaces and have mountainous curves facing outward relative to the rotating axis. The side surfaces 34 (34a, 34b , . . . ) of the regular polygonal cylinder corresponding to the side surfaces 14 of the regular polygonal cylinder 1A of the rotating polygon mirror 1 of FIG. 1(a) or 2(a) are curved surfaces instead of flat surfaces. These curved surfaces are mountainous outward relative to the rotating shaft 2.

FIGS. 5 (a) to 5 (e) show still other embodiments in which the convex surfaces are replaced by concave surfaces, respectively. This is a case where the respective sides of a regular polygon forms concave surfaces facing outward relative to the center of the regular polygon. FIGS. 5 (b) to (e) show sectional views taken along a line A–B of the respective embodiments. FIGS. 5 (b) and (d) show other embodiments corresponding to the embodiment of FIG. 1(a); FIGS. 5 (c) and (e) show other embodiments corresponding to the embodiment of FIG. 2(a). In the embodiments of FIGS. 5 (b) and (c), reflective surfaces 42 (42a, 42b, . . . ), 43 (43a, 43b, . . . ) corresponding to the reflective surfaces 12, 13 of the rotating polygon mirrors of FIGS. 1(a) and 2(a) are curved surfaces instead of flat surfaces. These curved surfaces are formed by removing, from the regular polygonal cylinder 1A, a regular polygonal truncated cone or an inverted regular polygonal truncated cone. The regular polygonal truncated cone has a bottom surface that is a flat surface whose respective sides of the regular polygon are curved so as to be concave relative to the center of the regular polygon. The inverted regular polygonal truncated cone has a top surface that is the above-mentioned flat surface whose respective sides are curved. Side surfaces 44 (44a, 44b , . . . ) of the regular polygonal cylinder corresponding to the side surfaces 14 of the regular polygonal cylinder 1A of the rotating polygon mirror 1 of FIG. 1(a) or 2(a) are curved surfaces instead of flat surfaces. These curved surfaces are outer side surfaces of the cylinder having the bottom surface that is the curved surface whose respective sides of the regular polygon are concave relative to the center of the regular polygon. That is, there are no curved surfaces in the direction of the rotating axis; the concave surfaces are formed in the direction opposite to the direction of the rotating axis 2.

The embodiments of FIGS. 5 (d), (e) have reflective surfaces 52 (52a, 52b, . . . ), 53 (53a, 53b, . . . ) corresponding to the first and second reflective surfaces 12, 13 of the rotating polygon mirrors 1 of FIGS. 1(a) and 2(a). These surfaces are curved surfaces instead of flat surfaces, and have valley-like curves facing outward relative to the rotating axis. The side surfaces 54 (54a, 54b , . . . ) of the regular polygonal cylinder corresponding to the side surfaces 14 of the regular polygonal Cylinder 1A of the rotating polygon mirror 1 of FIG. 1(a) or 2(a) are curved surfaces instead of flat surfaces. These curved surfaces are valley-like outward relative to the rotating axis 2.

If either the reflective surfaces 22 (22a, 22b, . . . ) or the reflective surfaces 23 (23a, 23b, . . . ) of FIGS. 3 (b) and (c) are convex or if the side surfaces 44 (44a, 44b , . . . ) of FIGS. 5 (b) and (c) are concave, then the scanning speed at the time the optical beam irradiates the subject area 5 can be controlled. In other words, constant-velocity linear scanning, etc. can be achieved. If, on the other hand, the side surfaces 24 (24a, 24b , . . . ) of FIGS. 3 (b) and (c) are convex, or if either the reflective surfaces 42 (42a, 42b, . . . ) or the reflective surfaces 43 (43a, 43b, . . . ) are concave, then the scanning width at the time the optical beam irradiates the subject area 5 can be increased.

Figure 4A:
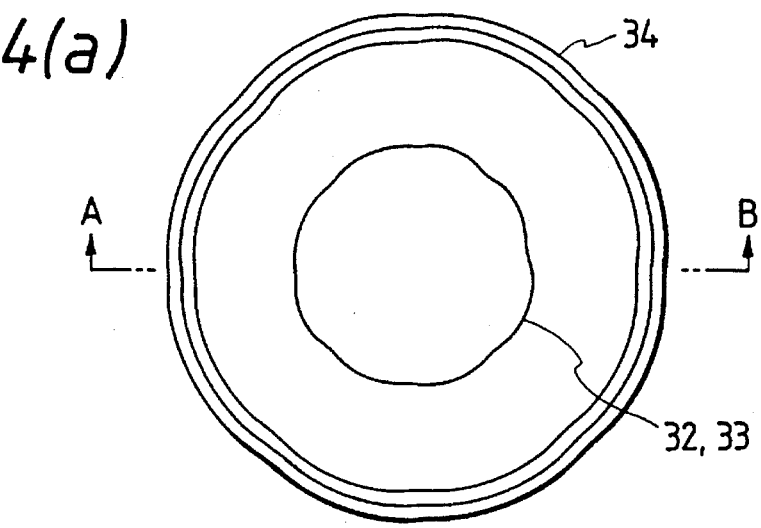
FIG. 4(a) is a diagram illustrative of convex surfaces of the rotating polygon mirror of the invention.
Figure 4B:
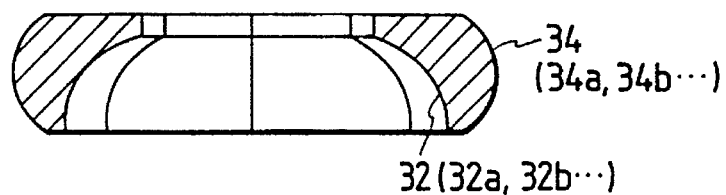
FIGS. 4(b) and 4(c) are sectional views taken along line A–B in FIG. 4(a) showing further alternative convex surface configurations.
Figure 4C:
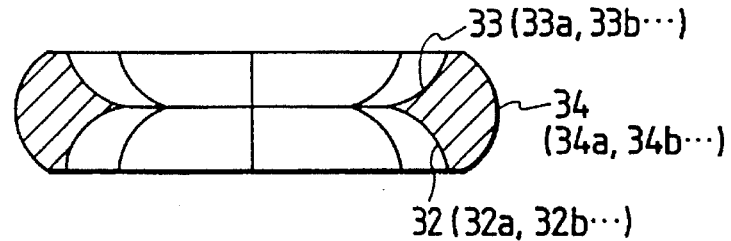

If concave surfaces are added to the reflective surfaces 52, 53 of FIGS. 5 (d) and (e), or if convex surfaces are added to the side surfaces 34 of FIGS. 4 (b) and (c), then positive power is given to the optical beam 4, thereby allowing flux of the optical beam 4 to be converged. On the other hand, if convex surfaces are added to the reflective surfaces 32, 33 of FIGS. 4 (b) and (c), or if concave surfaces are added to the side surfaces 54 of FIGS. 5 (d) and (e), then negative power is given to the optical beam 4, thereby allowing flux of the optical beam 4 to be diverged. Therefore, in the embodiments having mountainous curved surfaces or valley-like curved surfaces, the subject area 5 located in an arbitrary direction of depth can be scanned by selecting such curved surfaces. The other operations are the same as those of the rotating polygon mirror of the invention shown in FIG. 1(a). The one group of convex reflection surfaces with appropriate curvature in the embodiments shown in FIGS. 3(a) and 4(b) improves scanning linearity though the scanning length becomes shorter correspondingly.

In a conventional apparatus, functions such as convergence and divergence of the optical beam or constant-velocity linear scanning of the optical beam are required to be performed by laser beam printers or the like and the functions are performed by an optical lens that is independent of the rotating polygon mirror. However, the above-mentioned functions performed by the optical lens can be performed by forming at least one of the respective surfaces forming a transparent body in the invention into a convex or concave surface instead of a flat surface, thereby allowing the equivalent functions to be performed with no optical lens.

According to the above-mentioned construction, the rotating polygon mirror is designed so that the reflective surfaces thereof are total internal reflection surfaces formed on the inner side surfaces of the rotating polygon mirror made of a transparent body. As a result, the reflective surfaces are not directly exposed to the outside as is the case with the conventional rotating polygon mirror, thereby allowing stable conditions to be maintained at all times and contributing to improving durability thereof. The transparent body can be fabricated by molding, e.g., a transparent resin, thereby being suitable for mass production that is economical.

By adding convex or concave curved surfaces to the respective surfaces forming the transparent body as appropriate, the rotating polygon mirror can perform not only the function of constant-angle scanning of the optical beam, but also the function to be performed by the optical lens such as convergence and divergence of the optical beam or constant-velocity linear scanning of the optical beam, thereby contributing to downsizing, lightweight construction, and mass production of devices to which the invention is applied.

What is claimed is:

1. A rotatable polygon mirror comprising:
   a regular polygonal cylinder of transparent material having a plurality of outer side surfaces and corresponding inner side surfaces, said outer side surfaces being curved and symmetrical to one another relative to a rotational axis,
   said inner side surfaces being shaped to form total internal reflective surfaces, said inner side surfaces being curved in an axial direction.

2. A rotatable polygon mirror according to claim 1, wherein said total internal reflection surfaces are curved to be convex.

3. A rotatable polygon mirror according to claim 1, wherein said outer side surfaces of said regular polygonal cylinder are curved to be convex.

4. A rotatable polygon mirror according to claim 1, wherein said total internal reflection surfaces form side surfaces of a regular polygonal truncated cone having a bottom portion which is concentric with a bottom surface of said regular polygonal cylinder and said inner surfaces are diagonal relative to corresponding outer side surfaces of said regular polygonal cylinder.

5. A rotatable polygon mirror according to claim 4, wherein said total internal reflection surfaces are curved to be convex.

6. A rotatable polygon mirror according to claim 4, wherein said transparent outer side surfaces of said regular polygonal cylinder are curved to be convex.

7. A rotatable polygon mirror according to claim 4, wherein said inner side surfaces are curved to be concave.

8. A rotatable polygon mirror according to claim 4, wherein said outer side surfaces of said regular polygonal cylinder are curved to be concave.

9. A rotatable polygon mirror according to claim 1, wherein said total internal reflection surfaces include two groups forming a first group of inner side surfaces of a regular polygonal truncated cone having a bottom portion which is concentric with a bottom surface of said regular polygonal cylinder and said first group of inner side surfaces are diagonal relative to corresponding outer sides of said regular polygonal cylinder, and a second group of inner side surfaces of an inverted regular polygonal truncated cone having an upper portion which is concentric with an upper surface of said regular polygonal cylinder and said second group of inner side surfaces are diagonal relative to corresponding outer sides of said regular polygonal cylinder, said both groups of total internal reflection surfaces connecting with each other at a substantially center portion of the rotating axial direction of said regular polygonal cylinder.

10. A rotatable polygon mirror according to claim 9, wherein said first and second group of total internal reflection surfaces are curved to be convex.

11. A rotatable polygon mirror according to claim 9, wherein outer side surfaces of said regular polygonal cylinder are curved to be convex.

12. A rotatable polygon mirror according to claim 9, wherein said inner side surfaces are curved to be concave.

13. A rotatable polygon mirror according to claim 9, wherein said outer side surfaces of said regular polygonal cylinder are curved to be concave.

14. A rotatable polygon mirror according to claim 1, wherein said regular polygonal cylinder has a through hole along said rotating axis.

15. A rotatable polygon mirror according to claim 1, wherein said regular polygonal cylinder consists of a transparent resin.

16. A rotatable polygon mirror according to claim 1, wherein said regular polygonal cylinder consists of glass.

17. A rotatable polygon mirror according to claim 1, wherein said inner side surfaces of said regular polygonal cylinder are curved to be concave.

18. A rotatable polygon mirror according to claim 1, wherein said outer side surfaces of said regular polygonal cylinder are curved to be concave.

19. A rotatable polygon mirror comprising:
    a regular polygonal cylinder of transparent material having a plurality of outer side surfaces and corresponding inner side surfaces, said outer side surfaces being curved and symmetrical to one another relative to a rotational axis,
    said inner surfaces being shaped to provide total internal reflective surfaces and being configured in the form of a polygonal truncated cone.

20. A rotatable polygon mirror according to claim 19, wherein said inner surfaces are curved to be convex.

21. A rotatable polygon mirror according to claim 19, wherein said inner surfaces are curved to be concave.

22. A rotatable polygon mirror according to claim 19, wherein said outer side surfaces of said regular polygonal cylinder are curved to be convex.

23. A rotatable polygon mirror according to claim 19, wherein said outer side surfaces of said regular polygonal cylinder are curved to be concave.

* * * * *